(12) United States Patent
Snyder

(10) Patent No.: US 8,978,253 B2
(45) Date of Patent: Mar. 17, 2015

(54) MODULAR SPRING ASSEMBLY FOR A FOLDING TOOL

(75) Inventor: Douglas S. Snyder, Littleton, CO (US)

(73) Assignee: Spyderco, Inc., Golden, CO (US)

( * ) Notice: Subject to any disclaimer, the term of this patent is extended or adjusted under 35 U.S.C. 154(b) by 298 days.

(21) Appl. No.: 13/460,401

(22) Filed: Apr. 30, 2012

(65) Prior Publication Data

US 2013/0283620 A1 Oct. 31, 2013

(51) Int. Cl.
*B26B 1/02* (2006.01)
*F16F 1/06* (2006.01)

(52) U.S. Cl.
CPC .... *B26B 1/02* (2013.01); *F16F 1/06* (2013.01)
USPC .............................................. 30/155; 30/159

(58) Field of Classification Search
USPC .................. 30/158–161; 267/155; 7/118, 900
See application file for complete search history.

(56) References Cited

U.S. PATENT DOCUMENTS

| | | | |
|---|---|---|---|
| 4,535,539 A * | 8/1985 | Friedman et al. | 30/161 |
| 4,697,673 A * | 10/1987 | Omata | 188/291 |
| 5,755,035 A | 5/1998 | Weatherly | |
| 7,059,053 B2 | 6/2006 | Sakai | |
| 7,555,839 B2 * | 7/2009 | Koelewyn | 30/160 |
| 7,562,454 B2 * | 7/2009 | Steigerwalt et al. | 30/160 |
| 7,694,421 B2 * | 4/2010 | Lin | 30/159 |
| 7,918,028 B2 | 4/2011 | Steigerwalt et al. | |
| 8,042,276 B2 | 10/2011 | Lerch et al. | |
| 8,082,671 B2 * | 12/2011 | Saegesser | 30/392 |
| 8,505,206 B2 * | 8/2013 | Vanoy | 30/159 |
| 2001/0022113 A1 * | 9/2001 | Kojima et al. | 74/513 |
| 2004/0244205 A1 * | 12/2004 | Linn et al. | 30/159 |
| 2006/0123632 A1 * | 6/2006 | Linn et al. | 30/159 |
| 2008/0289198 A1 * | 11/2008 | Kaiser et al. | 30/514 |
| 2009/0056146 A1 * | 3/2009 | Duey | 30/159 |
| 2009/0183374 A1 * | 7/2009 | Kao | 30/159 |
| 2010/0000100 A1 * | 1/2010 | Saegesser | 30/392 |
| 2010/0236078 A1 * | 9/2010 | Duey | 30/159 |
| 2011/0099817 A1 * | 5/2011 | Duey | 30/159 |
| 2013/0233113 A1 * | 9/2013 | Saitoh | 74/473.36 |
| 2013/0263455 A1 * | 10/2013 | Collins et al. | 30/159 |
| 2013/0283620 A1 * | 10/2013 | Snyder | 30/159 |
| 2014/0047718 A1 * | 2/2014 | Fellows et al. | 30/161 |

OTHER PUBLICATIONS

U.S. Appl. No. 13/460,370, filed Apr. 30, 2012, Snyder et al.

* cited by examiner

*Primary Examiner* — Omar Flores Sanchez
(74) *Attorney, Agent, or Firm* — Sheridan Ross P.C.

(57) ABSTRACT

A modular spring assembly configured for interconnection with a folding tool is provided. The modular spring assembly may be positioned coaxially with a pivot axis of the folding tool and interconnected to the folding tool. In one embodiment, the modular spring assembly includes a cup and a torsion spring.

18 Claims, 6 Drawing Sheets

MODULAR SPRING ASSEMBLY FOR A FOLDING TOOL

FIELD

The present disclosure generally relates to a folding tool. More specifically, the present disclosure relates to a spring-actuated folding tool and in one embodiment a folding knife.

BACKGROUND

Many folding tools utilize a torsion spring to pivot an implement from a closed position to an open position. For example, many folding knives utilize a torsion spring to assist or automatically pivot a blade from a closed position to an open position. However, due in part to the demand for folding knives with small envelopes, such as those that can fit within a pocket of an article of clothing of a user, the space available for housing a torsion spring is minimal. Thus, as a general design practice, a torsion spring utilized in a folding knife is under-designed and overstressed, resulting in broken torsion springs.

Based on existing folding knives and tools, removal of a broken torsion spring may be difficult, especially in field applications. For example, existing folding knives generally require disassembly of the handle of the knife to access the torsion spring. This may require removal of numerous pins, fasteners, spacers, and other components of the folding knife, any number of which may be lost or misplaced, especially when disassembling the knife in the field.

Based upon at least the aforementioned problems, there exists a long-felt and unsolved need to provide a folding knife with a more robust torsion spring and/or an easily accessible torsion spring.

SUMMARY

Embodiments of the modular spring assembly disclosed herein can be utilized with any type or form of folding tool or apparatus with a rotatable implement or member. For example, embodiments of the locking mechanism disclosed herein can be utilized with multi-tools having various implements including, but not limited to, an awl, a container opener, a driver, a file, a knife, a saw, and scissors. For purposes of illustration and clarity, the embodiments disclosed herein are discussed in relation to a folding knife with a rotatable blade.

Embodiments of the present disclosure generally relate to a folding knife comprising a blade, a handle, and a modular spring assembly for assisting or automatically pivoting the blade towards an open position. In various embodiments, the blade is rotatable about a pivot axis that is generally perpendicular to the plane in which the blade rotates. In these embodiments, at least a portion of the blade, generally referred to as a tang, is disposed between a first handle portion and a second handle portion in both an open and closed position. Generally, the tang of the blade is rotatably interconnected to the handle.

It is an aspect of the present disclosure to provide a folding knife that is easily serviceable in the field. In one embodiment, a modular spring assembly is utilized with a folding knife. The modular spring assembly may be positioned coaxially with a pivot axis of a folding knife and removably interconnected to the knife. In this fashion, the modular spring assembly can be easily removed from the folding knife and provide access to a torsion spring associated with the folding knife. Thus, in field situations where a torsion spring breaks or a user wants to utilize a different torsion spring with a folding knife, the user can easily remove and replace the torsion spring without disassembling a handle of the folding knife.

It is another aspect of the present disclosure to provide a folding knife with a user settable pivot torque. In one embodiment, a modular spring assembly is utilized with a folding knife and comprises a spring module and a torsion spring. The spring module may be formed in various shapes, including a substantially planar plate or other designs which provide support to a portion of a spring. If the spring module includes a sidewall, the spring module is generally referred to herein as a cup. In one embodiment, the torsion spring is interconnected to the spring module and to a blade of the folding knife. In one configuration, rotation of the spring module about a pivot axis of the blade of the folding knife preloads the torsion spring. Thus, a user can rotate the spring module in the field and then interconnect the spring module to the knife to set a preload on the torsion spring. In one embodiment, the spring module and/or a corresponding component of a folding knife may include corresponding features to assist in imparting a predetermined torque on the torsion spring and in maintaining the rotational position of the spring module about a pivot axis of the blade of the folding knife.

It is another aspect of the present disclosure to provide a folding knife with additional space for accommodating a torsion spring. In one embodiment, an aperture is formed in a handle of a folding knife to accommodate a torsion spring. In addition, a spring module may be utilized and extend beyond an exterior surface of a handle of the folding knife to provide additional space for the torsion spring. The additional space may provide variability to the spring design. For example, the additional space may allow a torsion spring to include, for example, a larger wire diameter and/or adding additional coils, both of which, alone or in combination, may extend the life of the torsion spring.

It is a further aspect of the present disclosure to provide a folding knife with improved drainage of water and/or removal of debris out of a pivot area of the folding knife. In one embodiment, a modular spring assembly is utilized with a folding knife and includes a spring module having at least one drainage aperture. The aperture allows water and/or debris to be removed out of the folding knife, thus reducing factors that lead to corrosion within the critical moving parts of the knife. In addition, the at least drainage aperture may facilitate removal of the modular spring assembly from the folding knife.

The embodiments discussed herein can be modified to be used in association with any folding tool or apparatus with a rotatable implement or member. For example, the embodiments discussed herein can be modified to be used in association with any folding knife with a rotatable blade. Embodiments of the present disclosure may be adapted for use with any type of handle. For example, as used herein, a 'handle portion' can refer to a scale, a liner, a spacer, or any combinations thereof. The terms first and second are not intended to connote importance or priority, but are used to distinguish one component from another. Embodiments of the modular spring assembly discussed herein may be constructed of any materials now known or later developed in the art, including, but not limited to, aluminum, steel, and various forms of plastics.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

Figure 1:
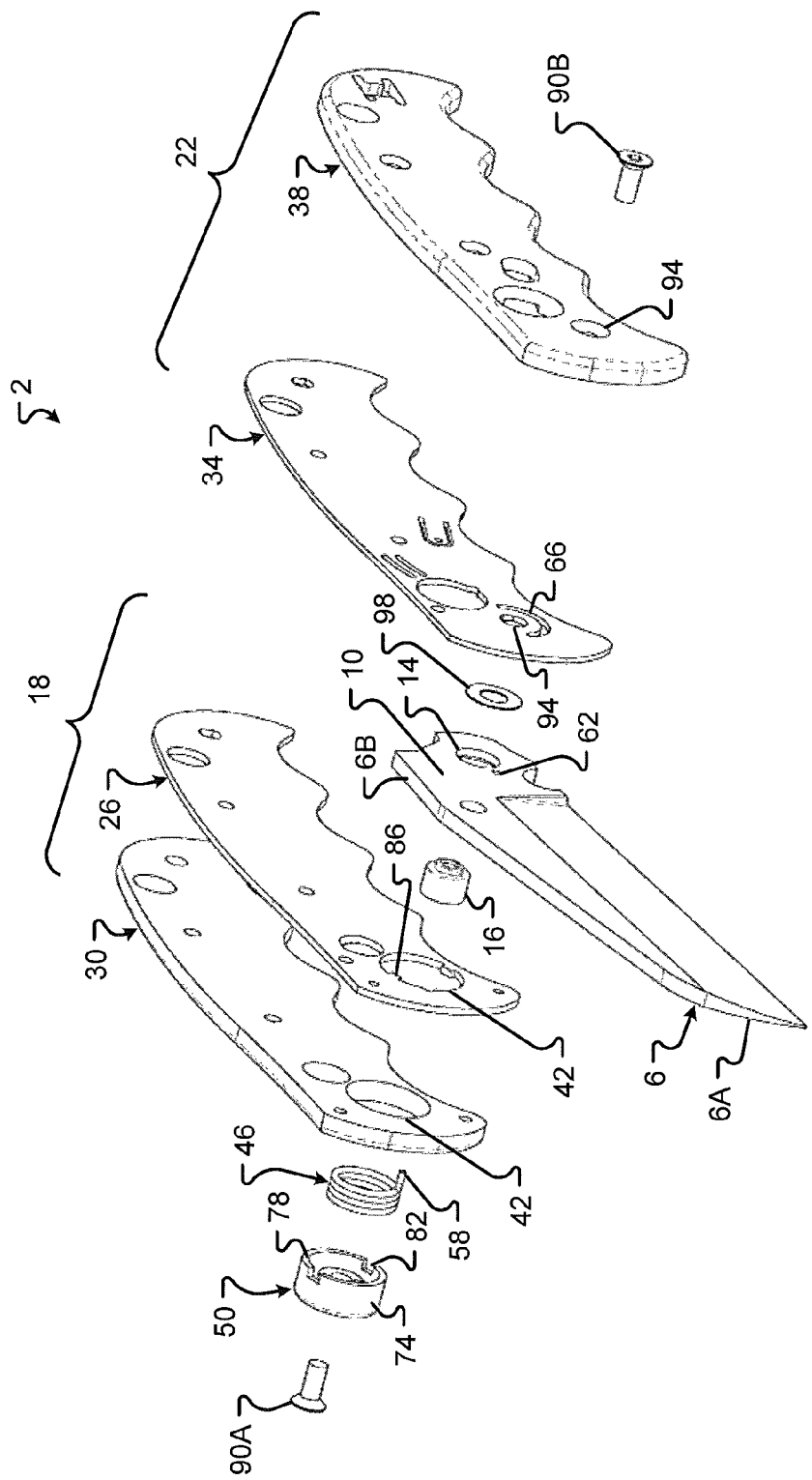
FIG. 1 is an exploded front perspective view of one embodiment of a folding knife in an open position.

It should be understood that the drawings are not necessarily to scale. In certain instances, details that are not necessary for an understanding of the disclosure or that render other details difficult to perceive may have been omitted. It should be understood, of course, that the claimed invention is not necessarily limited to the particular embodiments illustrated herein.

To assist in the understanding of the drawings, the following is a list of components and associated numbering found in the drawings:

| # | Components |
| --- | --- |
| 2 | Folding knife |
| 6 | Blade |
| 6A | Front end (of blade) |
| 6B | Rear end (of blade) |
| 8 | Handle |
| 8A | Forward portion (of handle) |
| 8B | Rear portion (of handle) |
| 10 | Tang (of blade) |
| 14 | Pivot aperture (of blade) |
| 16 | Bushing |
| 18 | First handle portion |
| 22 | Second handle portion |
| 26 | First liner |
| 30 | First scale |
| 34 | Second liner |
| 38 | Second scale |
| 42 | Aperture (of first handle portion) |
| 46 | Torsion spring |
| 50 | Cup |
| 54 | First end (of torsion spring) |
| 58 | Second end (of torsion spring) |
| 62 | Receiving aperture (of blade) |
| 66 | Cutout |
| 70 | Base (of cup) |
| 74 | Sidewall (of cup) |
| 78 | Distal end (of sidewall) |
| 82 | Slot |
| 86 | Tab |
| 90A, B | Pivot Pin |
| 94 | Aperture (of second handle portion) |
| 98 | Washer |
| 102 | Pivot axis |
| 106 | Push button |
| 110 | Modular spring assembly |
| 114 | Mandrel (of cup) |
| 118 | Interior space (of cup) |
| 122 | Aperture (of cup) |
| 126 | Recess (of blade) |
| 130 | Exterior surface (of handle) |
| 134 | Groove (of mandrel) |
| 138 | Exterior surface (of mandrel) |
| 142 | Drainage aperture (of cup) |
| 146 | Countersink (of cup) |
| 150 | Rounded edge (of cup) |

DETAILED DESCRIPTION

With reference to FIG. 1, an exploded perspective view of one embodiment of a folding knife 2 in an open position is provided. In the depicted embodiment, the folding knife 2 comprises a blade 6 and a handle 8. The blade 6 includes a front end 6A and a rear end 6B. The rear end 6B of the blade 6 includes a tang 10 that is configured to be rotatably interconnected to a forward portion 8A of the handle 8, shown in FIG. 2, about a pivot axis of the blade 6. The pivot axis extends through a center point of a pivot aperture 14 formed in the tang 10 of the blade 6 and is generally perpendicular to a rotation plane of the blade 6. The pivot aperture 14 may be configured to accommodate a bushing 16. Although not depicted, various fasteners, pins, spacers, and other components may be utilized in assembling the folding knife 2, as is known in the art.

As illustrated in FIG. 1, the tang 10 of the blade 6 is positioned between a first handle portion 18 and a second handle portion 22. As depicted, the first handle portion 18 comprises a first liner 26 and a first scale 30, and the second handle portion 22 comprises a second liner 34 and a second scale 38. Generally, the first handle portion 18 and the second handle portion 22 may include a liner, a scale, or various combinations thereof. In the depicted embodiment, an aperture 42 extends through the first handle portion 18, including the first liner 26 and the first scale 30, and is configured to accommodate a torsion spring 46 and a cup 50.

Figure 4:
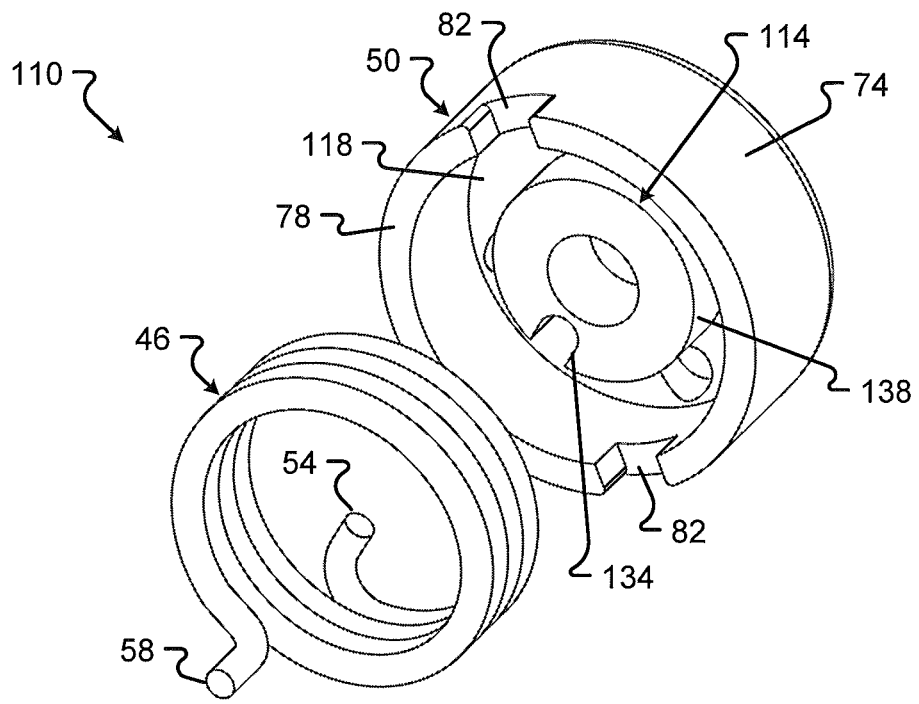
FIG. 4 is an exploded back perspective view of one embodiment of a modular spring assembly.
Figure 5:
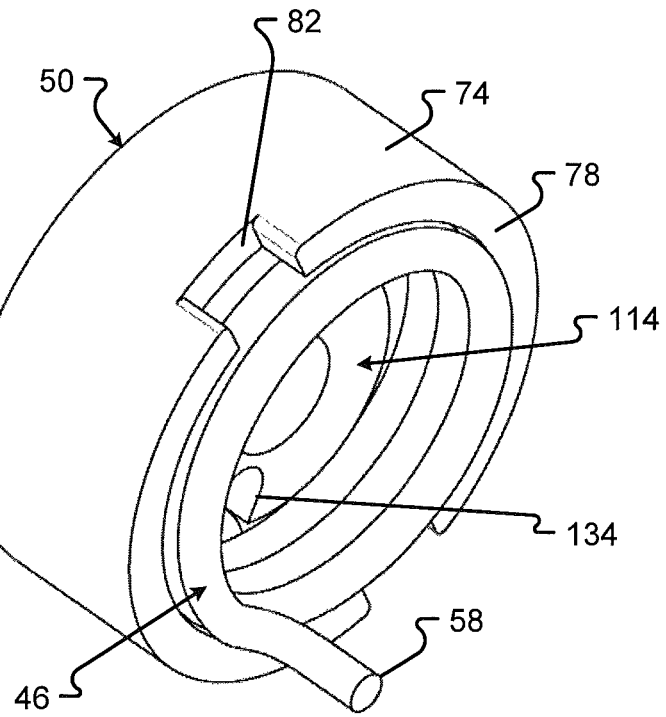
FIG. 5 is a back perspective view of the modular spring assembly shown in FIG. 4.
Figure 6:
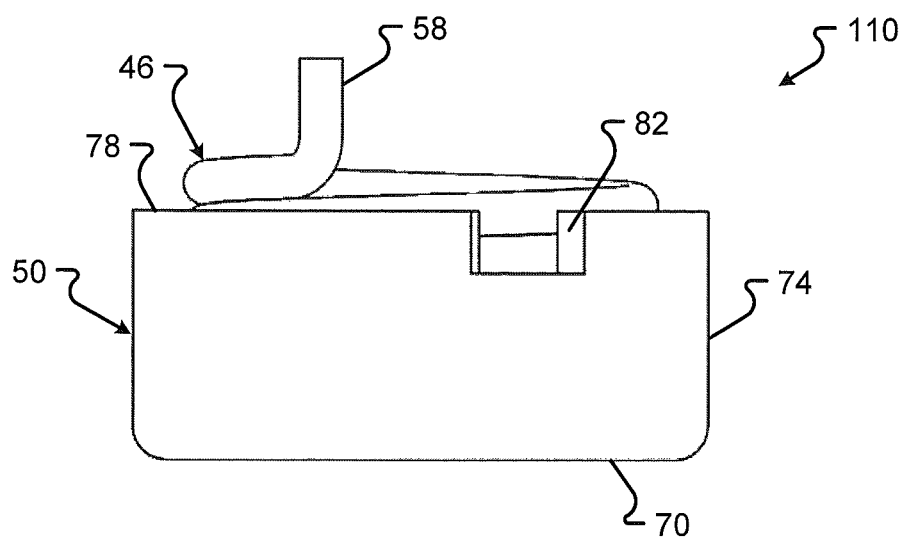
FIG. 6 is a side elevation view of the modular spring assembly shown in FIG. 4.
Figure 7:
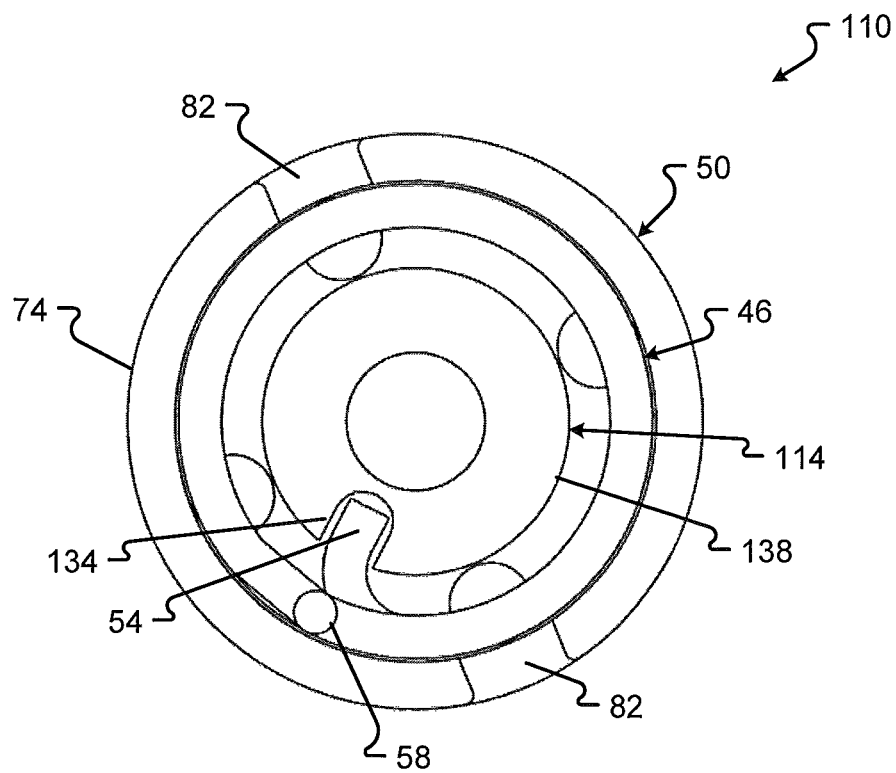
FIG. 7 is a back elevation view of the modular spring assembly shown in FIG. 4.
Figure 8:
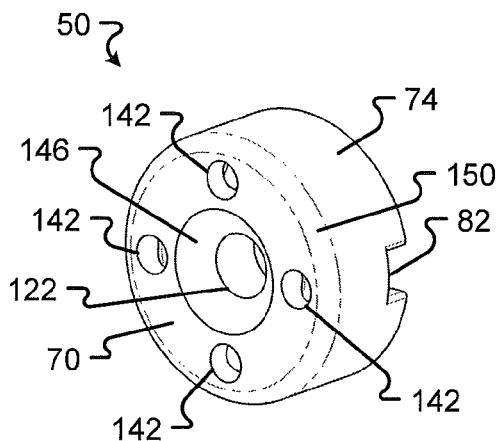
FIG. 8 is a front perspective view of one embodiment of a cup.
Figure 9:
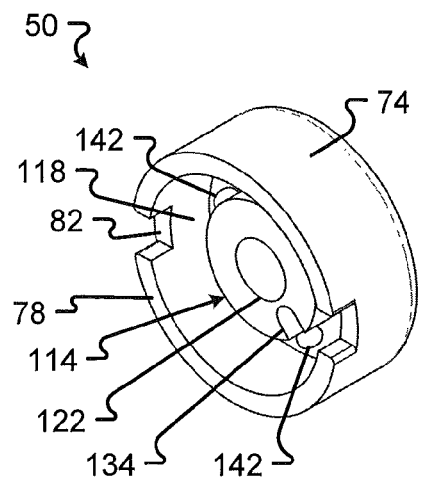
FIG. 9 is a back perspective view of the cup shown in FIG. 8.
Figure 10:
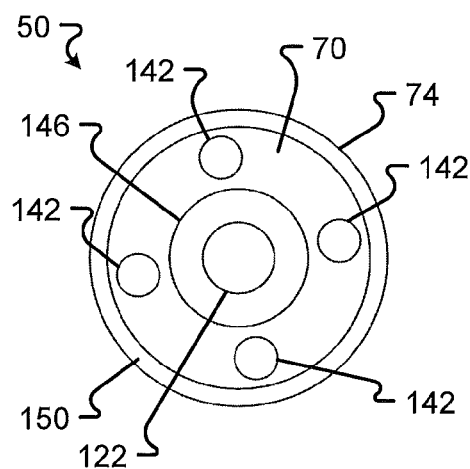
FIG. 10 is a front elevation view of the cup shown in FIG. 8.
Figure 11:
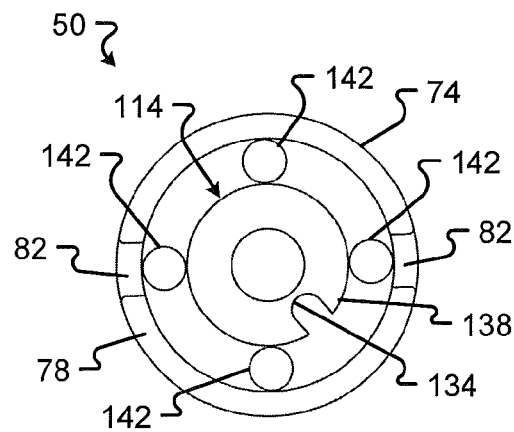
FIG. 11 is a back elevation view of the cup shown in FIG. 8.

The torsion spring 46 includes a first end 54, shown in FIG. 4, configured to interconnect to the cup 50 and a second end 58 configured to operatively interconnect to the blade 6 to pivot the blade 6 about the pivot axis of the blade 6. In one embodiment, a receiving aperture 62 may be formed in the tang 10 of the blade 6 to accommodate the second end 58 of the torsion spring 46. Further, in one embodiment, the second handle portion 22 may include a cutout 66 configured to accommodate the path of the second end 58 of the torsion spring 46 during rotation of the blade 6.

Figure 3:
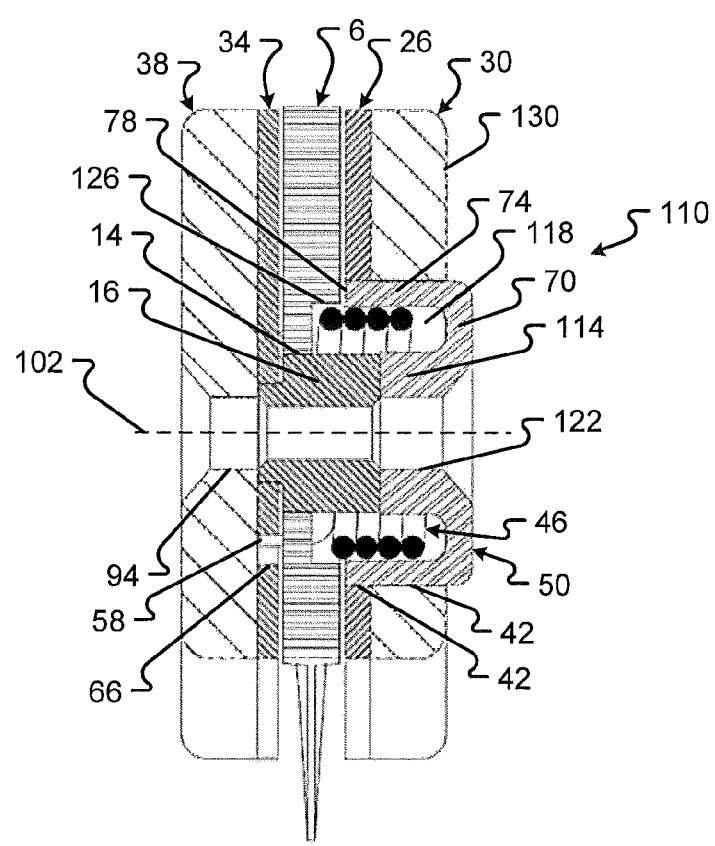
FIG. 3 is a cross-sectional view taken along line A-A of FIG. 2.

The cup 50 includes a base 70, shown in FIG. 3, and a sidewall 74 that extends perpendicular to the base 70. The cup 50 may be configured to at least partially house the torsion spring 46. In addition, the cup 50 may be configured to impart a predetermined preload on the torsion spring 46. For example, as illustrated in FIG. 1, the sidewall 74 has a distal end 78 with two slots 82 formed therein. The slots 82 are configured to matingly engage with corresponding tabs 86 formed in the first liner 26 to maintain the angular position of the cup 50 about the pivot axis of the blade 6. The tabs 86 are formed in a perimeter of the aperture 42 and protrude radially inward. The number of slots 82 and/or tabs 86 can vary. For example, in one embodiment, only one slot 82 and one tab 86 is provided. Alternatively, a plurality of slots 82 and/or tabs 86 may be provided to allow a user to impart different preloads on the torsion spring 46. Further, in one embodiment, the cup 50 includes a tab and the handle 8 includes a slot.

If provided, the slot 82 or tab 86 can be formed in various components of the handle 8. For example, a slot 82 or a tab 86 can be formed in a liner, a scale, or other handle components. In one embodiment, a bushing 16 interacts with the cup 50 to maintain the angular position of the cup 50 about the pivot axis of the blade 6.

Still referring to FIG. 1, at least one pivot pin may be utilized to rotatably interconnect the blade 6 to the handle 8, which may include a first handle portion 18 and a second handle portion 22. In FIG. 1, a first pivot pin 90A is configured to be inserted through an aperture formed in the cup 50 and an interior space of the torsion spring 46 and to interconnect with a bushing 16. In addition, a second pivot pin 90B is configured to be inserted through an aperture 94 formed in the second handle portion 22 and an aperture of the washer 98 and to interconnect with the bushing 16. In this configuration, the pivot pin 90A removably secures the cup 50 and the torsion spring 46 to the folding knife 2. Thus, in the field, a user can replace the torsion spring 46 without removing, or disassembling, the handle 8 of the folding knife 2. Rather, a user can remove the torsion spring 46 from the folding knife 2 by removing the pivot pin 90A. In one embodiment, the pivot pins 90A, 90B may be threaded to threadably engage the pivot bushing 16.

A method of preloading a torsion spring 46 associated with a folding knife 2 is provided as well. In one embodiment, a first end 54 of the torsion spring 46 is interconnected to a cup 50, and a second end 58 of the torsion spring 46 is interconnected to the blade 6 of the folding knife 2. Generally, the interconnection between the first end 54 of the torsion spring 46 and the cup 50 links the first end 54 of the torsion spring 46 to the angular displacement of the cup 50 about a pivot axis of a blade 6 of the folding knife 2. In one configuration, interconnecting the torsion spring 46 and the cup 50 comprises positioning the first end 54 of the torsion spring 46 within a groove formed in the cup 50. Generally, the interconnection between the second end 58 of the torsion spring 46 and a tang 10 of the blade 6 enables the torsion spring 46 to pivot the blade 6 about the pivot axis of the blade. In one configuration, interconnecting the torsion spring 46 and the blade 6 comprises inserting the second end 58 of the torsion spring 46 into a receiving aperture 62 formed in the tang 10 of the blade 6.

After the first end 54 and second end 58 of torsion spring 46 are interconnected to the cup 50 and the blade 6, respectively, the cup 50 may be rotated a predetermined angle about the pivot axis of the blade to preload the torsion spring 46. Generally, the amount of preload in the torsion spring 46 is increased as the angle of rotation of the cup 50 is increased. Once the torsion spring 46 has been preloaded, the cup 50 may be removably secured to the folding knife 2 to set the preload on the torsion spring 46 and to prevent the torsion spring 46 and the cup 50 from being inadvertently dislodged from the folding knife 2. In one configuration, a pivot pin 90A removably secures the cup 50 and the torsion spring 46 to the folding knife 2. A slot 82, a tab 86, a groove, and/or a spline may be formed in the cup 50 and/or a handle 8 of the folding knife 2 to ensure the rotation of the cup 50 about the pivot axis is fixed at a predetermined angle, thereby ensuring a predetermined preload is set on the torsion spring 46.

A method of removing a modular spring assembly from a folding knife 2 also is provided. In one embodiment, a pivot pin 90A is removed from the folding knife 2. After removing the pivot pin 90A, a cup 50 is axially displaced along a pivot axis of a blade 6 of the folding knife 2 in a direction away from the blade 6. The axial displacement may slide the cup 50 out of an aperture 42 formed in a handle 8 of the folding knife 2 and disengage a slot 82 or groove from engagement with a tab 86. The axial displacement of the cup 50 may disconnect a first end 54 of a torsion spring 46 from the cup 50 and/or a second end 58 of the torsion spring 46 from the blade 6 of the folding knife 2. If still connected after removal of the cup 50 from the folding knife 2, the torsion spring 46 may be disconnected from the cup 50 and/or the blade 6. In this fashion, the torsion spring 46 can be removed from the folding knife 2 without disassembling the handle of the folding knife 2.

Figure 2:
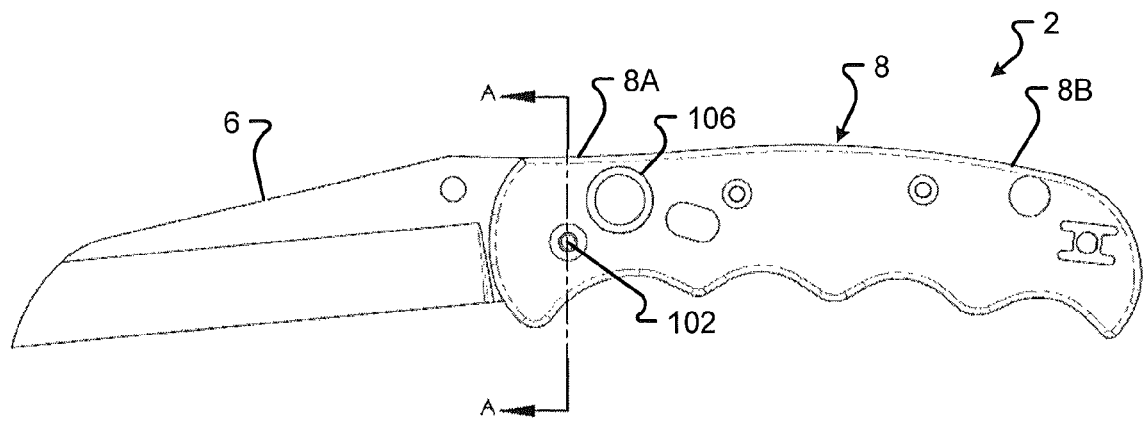
FIG. 2 is a front elevation view of one embodiment of a folding knife in an open position.

Referring to FIG. 2, one embodiment of a folding knife 2 in an open position is provided. The folding knife 2 includes a blade 6 rotatably interconnected to a handle 8 about a blade pivot axis 102. As depicted, the handle 8 includes a forward portion 8A and a rear portion 8B. Also depicted in FIG. 2 is a push button 106, which may form part of a lock and/or release mechanism.

FIG. 3 is a cross-sectional view taken along line A-A of FIG. 2. As depicted in FIG. 3, a modular spring assembly 110, comprising a torsion spring 46 and a cup 50, is positioned coaxially with the pivot axis 102 of the blade 6. The embodiment of the cup 50 illustrated in FIG. 3 comprises a base 70, a sidewall 74 extending perpendicular to the base 70, and a mandrel 114 positioned radially inward of the sidewall 74 and extending perpendicular to the base 70 to define an interior space 118 of the cup 50. As illustrated, the torsion spring 46 is at least partially disposed in the interior space 118 of the cup 50. A first end 54, not shown in FIG. 3, of the torsion spring 46 is interconnected to the cup, and a second end 58 of the torsion spring 46 is operatively interconnected to the blade 6 to pivot the blade 6 about the pivot axis 102. In FIG. 3, the second end 58 of the torsion spring 46 extends into a cutout 66 formed in the second handle portion 22, particularly the second liner 34.

In one embodiment, the cup 50 is rotated about the pivot axis 102 to preload the torsion spring 46. In one configuration, as the cup 50 is rotated to impart a preload on the torsion spring 46, the diameter of the torsion spring 46 decreases. In this configuration, the outside diameter of the mandrel 114 and/or the bushing 16 define a minimum inside diameter of the torsion spring 46. As such, the outside diameter of the mandrel 114 and/or the bushing 16 can be selectively dimensioned to ensure a predefined maximum stress in the torsion spring 46 is not exceeded, thus extending the life of the torsion spring 46. In another configuration, as the cup 50 is rotated to impart a preload on the torsion spring 46, the diameter of the torsion spring 46 increases. In this configuration, the inner diameter of the sidewall 74 of the cup 50, the diameter of the aperture 42, and/or the diameter of a recess 126, if provided, of the blade 6 define a maximum outside diameter of the torsion spring 46. As such, the inside diameter of the sidewall 74, the diameter of the aperture 42, and/or the diameter of the recess 126 can be selectively dimensioned to ensure a predefined maximum stress in the torsion spring 46 is not exceeded, thus extending the life of the torsion spring 46. In one embodiment, the cup 50 comprises a base 70 without a mandrel 114. In this embodiment, the bushing 16 may define a minimum inside diameter of the torsion spring 46. In one embodiment, a spring module comprises a base 70 without a sidewall 74, and the base 70 may be a substantially planar plate. In this embodiment, the aperture 42 and/or the recess 126 may define a maximum outside diameter of the torsion spring 46. In one embodiment, a spring module comprises a base 70, which may be a substantially planar plate, without a sidewall 74 or a mandrel 114. In this embodiment, the aperture 42 and/or the recess 126 may define a maximum outside diameter of the torsion spring 46, and the bushing 16 may define a minimum inside diameter of the torsion spring 46.

In one embodiment, the cup 50 is completely disposed within the aperture 42 formed in the first handle portion 18, depicted as a first liner 26 and a first scale 30. In an alternative embodiment, the cup 50 may be partially disposed within the aperture 42 formed in a handle portion. For example, in FIG. 3, the cup 50 is disposed within the aperture 42 formed in the first liner 26 and the first scale 30, but the cup 50 extends beyond an exterior surface 130 of the handle. This extension increases the volume of the interior space 118, which in turn provides variability to the design of the torsion spring 46. The design variability may include, but is not limited to, adding more coils to the torsion spring 46 and/or utilizing a larger wire diameter. As another example, the aperture 42 may be stepped such that the cup 50 can only be partially disposed within a handle portion. In this example, the smaller diameter of the stepped portion of the aperture 42 may correspond with an inner diameter of a sidewall 74 of the cup 50. In another embodiment, at least a portion of the cup 50 may abut the exterior surface 130 of the handle. For example, a distal end 78 of the sidewall 74 may abut the exterior surface 130 of the handle. As another example, a base 70 of a spring module may abut the exterior surface 130 of the handle. In this example, the spring module may comprise a substantially planar base 70 without a sidewall 74, in which case a diameter of the aperture 42 may define the maximum outside diameter of the torsion spring 46. In addition, the spring module may comprise a base 70 without a mandrel 114, in which case a bushing 16 may define the minimum inside diameter of the torsion spring 46. Further, the spring module may comprise a base 70 without a sidewall 74 or a mandrel 114.

The embodiment of the cup 50 depicted in FIG. 3 also includes an aperture 122 positioned coaxially with the pivot axis 102 and extending through the base 70 and the mandrel 114. The aperture 122 is configured to accommodate a pivot pin 90A, shown in FIG. 1, for removably securing the modular spring assembly 110 to the folding knife 2. As depicted in FIG. 3, the mandrel 114 abuts a bushing 16, which is disposed within a pivot aperture 14 of the blade 6. In one embodiment, the cup 50 may not include a mandrel 114, in which case the bushing 16 may abut the base 70 of the cup 50. In one embodiment, the pivot pin 90A interconnects with the bushing 16 to removably secure the modular spring assembly 110 to the folding knife 2. In one configuration, the pivot pin 90A may be threaded and configured to threadably engage an internally-threaded bushing 16.

Referring now to FIGS. 4-7, one embodiment of a modular spring assembly 110 is provided. The modular spring assembly 110 of FIGS. 4-7 includes a torsion spring 46 and a cup 50. The torsion spring 46 includes a first end 54 that interconnects to the cup 50 and a second end 58 that interconnects to a blade 6 of a folding knife 2. Generally, the interconnection between the first end 54 of the torsion spring 46 and the cup 50 links the first end 54 of the torsion spring 46 to the angular displacement of the cup 50 about a pivot axis 102 of a blade 6 of the folding knife 2. In FIGS. 4-7, the cup 50 includes a mandrel 114 having a groove 134 extending lengthwise in an exterior surface 138 of the mandrel 114. The groove 134 is configured to receive the first end 54 of the torsion spring 46 to interconnect the torsion spring 46 to the cup 50. In alternative embodiments, the first end 54 of the torsion spring 46 may be configured to interconnect to different features of the spring module. For example, the first end 54 of the torsion spring 46 may be configured to interconnect with the base 70, especially in spring module configurations that do not include a sidewall 74 or a mandrel 114. As another example, the first end 54 may be configured to interconnect to the sidewall 74 of the cup 50, especially in configurations of the cup 50 that do not include a mandrel 114.

Referring still to FIGS. 4-7, the torsion spring 46 is partially disposed in an interior space 118 of the cup 50 and extends beyond a distal end 78 of the cup 50. In an alternative embodiment, the torsion spring 46 may be completely disposed in an interior space 118 of the cup 50. In another embodiment, the torsion spring 46 may not be disposed in an interior space 118 of the spring module, for example, in spring module configurations that do not include a sidewall 74 or a mandrel 114.

Referring now to FIGS. 8-11, one embodiment of a cup 50 is provided. The cup 50 illustrated in FIGS. 8-11 includes a base 70, a sidewall 74 extending perpendicular to the base 70, and a mandrel 114 extending perpendicular to the base 70. The base 70, the sidewall 74, and/or the mandrel 114 may define an interior space 118 configured to accommodate a torsion spring 46.

In one embodiment, the base 70 of the cup 50 includes at least one drainage aperture 142. In one configuration, the at least one drainage aperture 142 is disposed radially between the sidewall 74 and the mandrel 114. Generally, the at least one drainage aperture 142 provides for drainage of water and/or debris from the pivot area of the folding knife 2 and, in one configuration, facilitates removal of the cup 50 from the folding knife 2. For example, a tool may be employed to interact with the at least one drainage aperture 142 to facilitate removal of the cup 50. In one embodiment, the at least one drainage aperture 142 comprises four drainage apertures 142. In one embodiment, a plurality of drainage apertures 142 are spaced equidistant along a circular arc disposed radially between the sidewall 74 and the mandrel 114.

In one embodiment, the base 70 of the cup 50 includes an aperture 122 configured to accommodate a pivot pin 90A. In one configuration, the aperture 122 is positioned in the center of the base 70 and extends through a mandrel 114, if included in the cup 50. As illustrated, the base 70 may include a countersink 146, or alternatively a counterbore, to accommodate a head of the pivot pin 90A. Further, the base 70 may include a rounded edge 150.

In one embodiment, a mandrel 114 is positioned radially inward of the sidewall 74. The mandrel 114 may include a groove 134 formed in an exterior surface 138 of the mandrel 114 and configured to accommodate a first end 54 of a torsion spring 46. The groove 134 may be formed in various cross-sectional shapes. In addition, the groove 134 may extend various lengths of the mandrel 114. As illustrated, the groove 134 is generally u-shaped and extends the full length of the mandrel 114.

Figure 14:
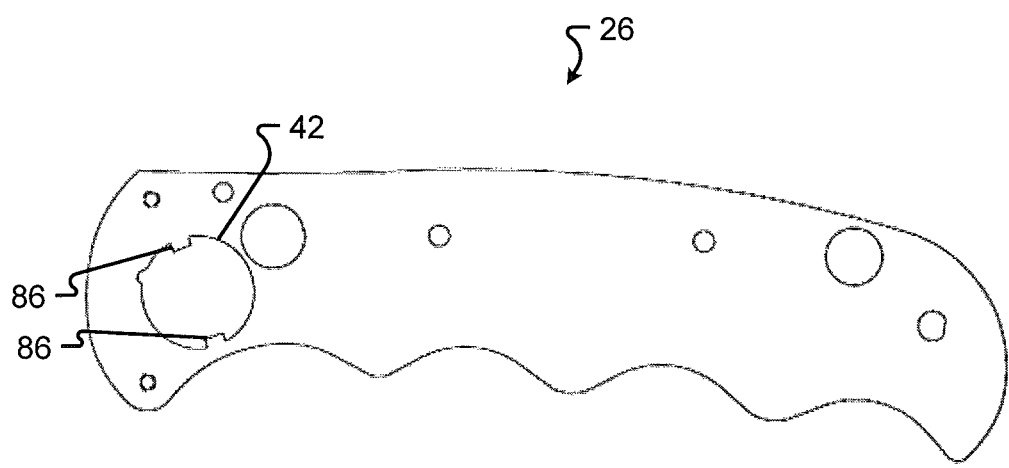
FIG. 14 is a front elevation view of one embodiment of a liner.

In one embodiment, the cup 50 includes a feature that fixes the cup 50 rotationally to a component of a folding knife 2. For example, in FIGS. 8-11, a sidewall 74 includes at least one slot 82 formed in a distal end 78 of the sidewall 74. The two slots 82 depicted in FIGS. 8-11 are generally configured to engage a corresponding feature on a component of the folding knife 2 to restrict rotation of the cup 50 about the pivot axis 102 of the blade 6 of the folding knife 2. For example, after the cup 50 has been rotated a certain angle about the pivot axis 102 to impart a torque on a torsion spring 46, a slot 82 may be matingly engaged with a tab formed on a component of the folding knife 2. In one configuration, the distal end 78 of the sidewall 74 has a plurality of slots configured to impart different preloads on the torsion spring 46. In an alternative configuration, at least one groove may be formed in an exterior surface of the sidewall 74. For example, a plurality of grooves may be formed in the exterior surface of the sidewall 74 for a spline-like engagement with a handle portion of a folding knife 2. In another configuration, a tab or protrusion may be formed in the cup 50. The rotational fixing features of the spring module may be formed in the base 70, the sidewall 74, and/or the mandrel 114. In addition, the corresponding features of the folding knife 2 may be formed, for example, in a scale, a liner, and/or a bushing 16. In one embodiment, as illustrated in FIG. 1 and FIG. 14, at least one tab 86 may be formed in an aperture 42 of a liner 26 and configured to matingly engage with a corresponding feature formed in a cup 50, thereby preventing rotation of the cup 50 about the pivot axis 102 of the blade 6 of the folding knife 2.

Figure 12:
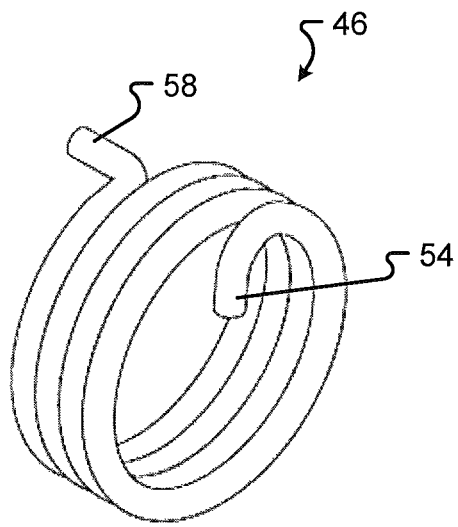
FIG. 12 is a front perspective view of one embodiment of a torsion spring.
Figure 13:
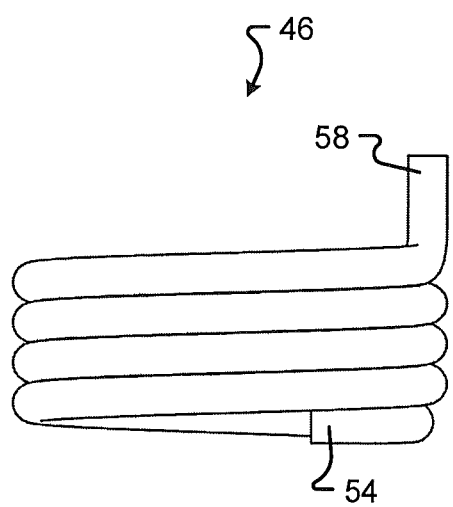
FIG. 13 is a side elevation view of the spring shown in FIG. 12.

Referring now to FIGS. 12-13, one embodiment of a torsion spring 46 is provided. The torsion spring depicted in FIGS. 12-13 includes a first end 54 and a second end 58. In FIGS. 12-13, the first end 54 of the torsion spring 46 is bent radially inward towards a longitudinal axis of the torsion spring 46, and the second end 58 of the torsion spring 46 is bent orthogonal to the first end 54 of the torsion spring 46 and generally parallel to the longitudinal axis of the torsion spring 46. In alternative embodiments, the first end 54 and the second end 58 of the torsion spring 46 may be configured in various orientations. In FIGS. 12-13, the torsion spring 46 includes four coils. In alternative embodiments, the number of coils can vary depending on, for example, the desired torque characteristics of the torsion spring 46.

While various embodiments have been described in detail, it is apparent that modifications and alterations of those embodiments will occur to those skilled in the art. For example, various features of the disclosure have been grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. It is to be expressly understood that such modifications and alterations are within the scope and spirit of the claimed invention, as set forth in the following claims.

What is claimed is:

1. A selectively removable modular spring assembly adapted for interconnection to a spring activated folding tool having an implement rotatably interconnected to a handle about a pivot axis, the modular spring assembly comprising:
    a cup comprising a base and a sidewall extending perpendicular to the base, the sidewall defining an interior space, and a mandrel extending perpendicular to the base an positioned radially inward of the sidewall, the mandrel defining a minimum inside diameter of the torsion spring and the mandrel comprising a groove extending lengthwise in an exterior surface, and wherein the groove is configured to receive the first end of the torsion spring to interconnect the first end of the torsion spring to the cup; and
    a torsion spring at least partially disposed in the interior space of the cup, the torsion spring having a first end and a second end, the first end of the torsion spring interconnected to the spring module, and the second end of the torsion spring configured to be operatively interconnected to the implement to pivot the implement about the pivot axis.

2. The modular spring assembly of claim 1, wherein the sidewall has a distal end with a slot configured to matingly engage the handle of the folding tool to prevent rotation of the cup about the pivot axis.

3. The modular spring assembly of claim 2, wherein the sidewall has a plurality of slots defined in the distal end of the sidewall.

4. The modular spring assembly of claim 1, wherein the base of the cup comprises a drainage aperture disposed radially between the mandrel and the sidewall.

5. The modular spring assembly of claim 1, wherein the base of the cup includes an aperture positioned in the center of the base, and wherein the aperture is configured to accommodate a pin for removably securing the modular spring assembly to the folding tool.

6. The modular spring assembly of claim 1, wherein the folding tool comprises a folding knife, and wherein the implement comprises a blade.

7. A folding knife with a selectively removable torsion spring, comprising:
    a handle comprising a first handle portion, a second handle portion, a forward end, and a rearward end;
    a blade at least partially disposed between the first handle portion and the second handle portion, the blade having a tang on a rear end of the blade, the tang rotatably interconnected to the forward portion of the handle about a pivot axis; and
    a modular spring assembly positioned coaxially with the pivot axis, the modular spring assembly comprising:

a cup comprising a base, a sidewall extending perpendicular to the base, and a mandrel positioned radially inward of the sidewall and extending perpendicular to the base to define a space between the mandrel and the sidewall, wherein the cup matingly engages with at least one of the first handle portion or the second handle portion to prevent rotation of the cup about the pivot axis; and a torsion spring at least partially disposed in the space defined between the mandrel and the sidewall, the torsion spring having a first end and a second end, the first end of the torsion spring interconnected to the cup, the second end of the torsion spring operatively interconnected to the blade to pivot the blade about the pivot axis, wherein the torsion spring is removable from the folding knife without removing the first handle portion or the second handle portion.

8. The folding knife of claim 7, further comprising a pin removably securing the modular spring assembly to the folding knife.

9. The folding knife of claim 7, wherein the mandrel comprises an exterior surface and a groove extending lengthwise in the exterior surface, and wherein the groove is configured to receive the first end of the torsion spring to interconnect the first end of the torsion spring to the spring module.

10. The folding knife of claim 7, wherein the base of the cup comprises a drainage aperture disposed radially between the mandrel and the sidewall.

11. The folding knife of claim 7, wherein at least one of the first handle portion or the second handle portion comprises an aperture positioned coaxially with the pivot axis, wherein the aperture is configured to accommodate the cup, and wherein the cup is at least partially positioned within the aperture.

12. The folding knife of claim 11, wherein the aperture has a perimeter with a tab protruding radially inward, wherein the sidewall has a distal end with a slot, and wherein the slot matingly engages with the tab to maintain the angular position of the cup about the pivot axis.

13. The folding knife of claim 11, wherein at least one of the first handle portion or the second handle portion comprises a scale and a liner, wherein the aperture extends through the scale and the liner, and wherein the cup matingly engages with the liner to maintain the angular position of the cup about the pivot axis.

14. A folding knife with a spring activated blade, comprising:

a handle having a forward portion, a rear portion, a first scale, and a second scale positioned in opposing relationship to the first scale;

a blade at least partially disposed between the first scale and the second scale, the blade having a front end and a rear end, the rear end of the blade having a tang rotatably interconnected to the forward portion of the handle about a pivot axis;

a modular spring assembly positioned coaxially with the pivot axis, the modular spring assembly comprising:

a cup comprising a base and a sidewall extending perpendicular to the base, the base having an aperture positioned coaxially with the pivot axis, the sidewall defining an interior space; and a torsion spring at least partially disposed in the interior space of the cup, the torsion spring having a first end and a second end, the first end of the torsion spring interconnected to the cup, the second end of the torsion spring operatively interconnected to the blade to pivot the blade about the pivot axis;

a pin at least partially disposed within the aperture of the base of the cup, the pin removably securing the modular spring assembly to the folding knife, whereby the torsion spring is removable from the folding knife without removing the first scale or the second scale; and wherein the cup comprises a mandrel extending perpendicular to the base and positioned radially inward of the sidewall, the mandrel defining a minimum inside diameter of the torsion spring and the mandrel comprising an exterior surface and a groove extending lengthwise in the exterior surface, wherein the groove is configured to receive the first end of the torsion spring to interconnect the first end of the torsion spring to the spring module.

15. The folding knife of claim 1, wherein at least one of the first scale or the second scale comprises an aperture positioned coaxially with the pivot axis, wherein the aperture is configured to accommodate the cup, and wherein the cup is at least partially positioned within the aperture.

16. The folding knife of claim 15, wherein the aperture has a perimeter with a tab protruding radially inward, wherein the sidewall has a distal end with a slot, and wherein the slot matingly engages with the tab to prevent rotation of the cup about the pivot axis.

17. The folding knife of claim 16, wherein the distal end of the sidewall has a plurality of slots configured to impart different preloads on the torsion spring.

18. The folding knife of claim 15, wherein the handle further comprises a liner positioned between the first scale and the second scale, wherein the aperture extends through the liner, and wherein the cup matingly engages with the liner to prevent rotation of the cup about the pivot axis.

* * * * *